Inventor
DON A. KRAMER
BY
ATTYS.

Inventor
DON. A. KRAMER
BY Mueller, Aichele & Rauner
ATTYS.

3,447,027
PINCUSHION CORRECTION CIRCUIT

Don A. Kramer, Rolling Meadows, Ill., assignor to Motorola, Inc., Franklin Park, Ill., a corporation of Illinois Filed Sept. 18, 1967, Ser. No. 668,540
Int. Cl. H01j 29/70
U.S. Cl. 315—24 7 Claims

ABSTRACT OF THE DISCLOSURE

The circuit includes means to develop a parabolic signal at the vertical sweep frequency for controlling the capacitance of voltage variable capacitors. The capacitors are coupled in circuit with the horizontal sweep system to modify the horizontal deflection current and thereby straighten the sides of the raster.

Background of the invention

The use of wide deflection angle cathode ray tubes that have relatively flat rectangular viewing screens results in what is commonly referred to as pincushion distortion of the raster. Such distortion is usually corrected in black and white receivers by modifying the deflection yokes to provide nonsymmetrical sweep when substantial linear sawtooth waves are applied. However, with the relatively complicated deflection system for a trigun cathode ray tube of the type used in color television receivers, it is desirable to avoid introducing a nonsymmetrical convergence error so that essentially linear field yokes are desirable. This requires that pincushion distortion be corrected by modifying the signals generated in the deflection systems rather than modification of the yoke structure.

A number of circuits which have been proposed to correct for raster distortion in multibeam cathode ray tubes dynamically vary the signal from one deflection system with a correctional signal derived from the other deflection system. For distortion of the sides of the raster, the horizontal deflection signal may be made to scan at different widths in response to a shaped parabolic signal derived from the vertical deflection system. One system utilizes a saturable reactor coupled in series with the horizontal deflection yoke winding the impedance of which is parabolically changed at the vertical sweep frequency to provide decreasing scan width towards the top and bottom of the raster to thereby straighten the sides. However, such a device has not been entirely satisfactory as it is quite expensive and generally does not operate at an optimum efficiency.

Summary of the invention

It is accordingly an object of the present invention to provide an improved circuit utilizing low cost components having high efficiency for dynamic correction of the pincushion distortion on the borders of the raster of a cathode ray tube viewing screen.

In practicing a preferred form of the invention, a circuit is coupled to the vertical sweep system in a television receiver to provide a parabolic signal at the vertical frequency. Voltage variable capacitor means are coupled to the circuit and responsive to the parabolic signal to have its capacitance parabolically change at a rate established by the vertical frequency. The capacitor means are coupled in circuit with the horizontal yoke winding and the horizontal sweep system to modify the horizontal sweep signals and straighten the sides of the raster.

Detailed description of the preferred embodiment

Figure 1:
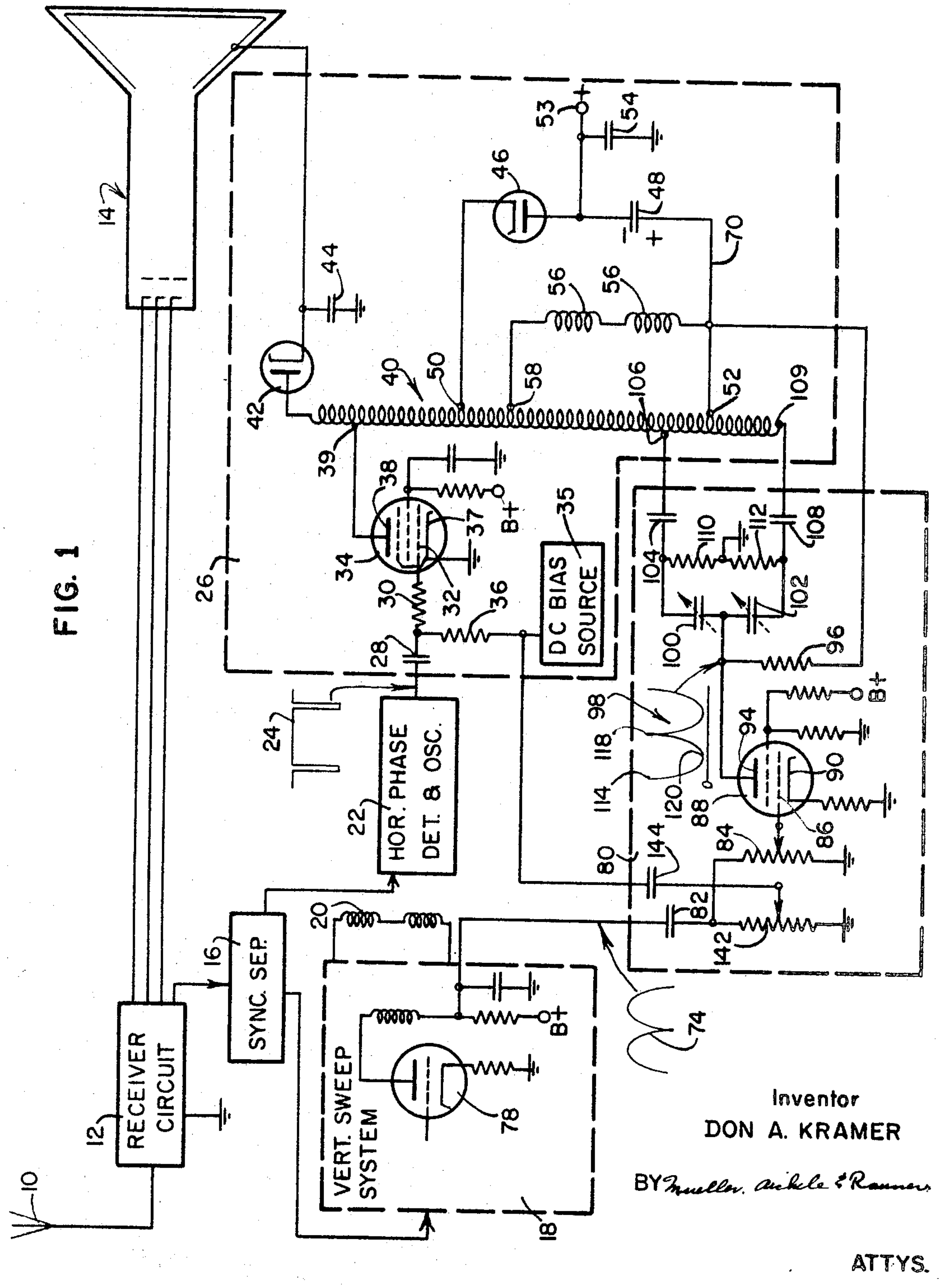
FIG. 1 illustrates a television receiver partially in block and partially in schematic incorporating the voltage variable capacitors according to the invention.

Referring now to the television receiver of FIG. 1, a television signal is received by an antenna 10 and processed in a known manner by a receiver circuit 12 to produce video information for a multigun cathode ray tube 14. Vertical synchronizing signals are separated from the video information in a synchronizing signal separator circuit 16 and are coupled to a vertical sweep system 18 which causes a sawtooth current to flow in the vertical yoke winding 20 for vertically deflecting the cathode ray beams. Horizontal synchronizing signals separated from the video information in the circuit 16 are applied to horizontal phase detector and oscillator circuit 22 which develops a series of negatively poled pulses 24 at the horizontal sweep frequency for application to the horizontal output system 26.

The horizontal output system 26 includes a coupling capacitor 28 and a resistor 30 coupled in series between the circuit 22 and the control grid 32 of an electron control device such as a vacuum tube pentode 34. A DC bias source 35 provides a bias voltage for tube 34 through resistors 36 and 30. The cathode 37 of tube 34 is grounded and the anode 38 is coupled to a first tap 29 on autotransformer 40. The uppermost end of the transformer is coupled to a diode 42 and a capacitor 44 which respectively rectify and filter the horizontal pulses to provide high voltage for the final anode of cathode ray tube 14. A damper diode 46 and a boost capacitor 48 are coupled in series between a second tap 50 and a third tap 52 of the autotransformer 40. A DC potential from source 53 is filtered by pass capacitor 54 and coupled to the junction of diode 46 and capacitor 48. A horizontal deflection yoke winding 56 is coupled betwen a fourth tap 58 and tap 52 of autotransformer 40.

Figure 2:
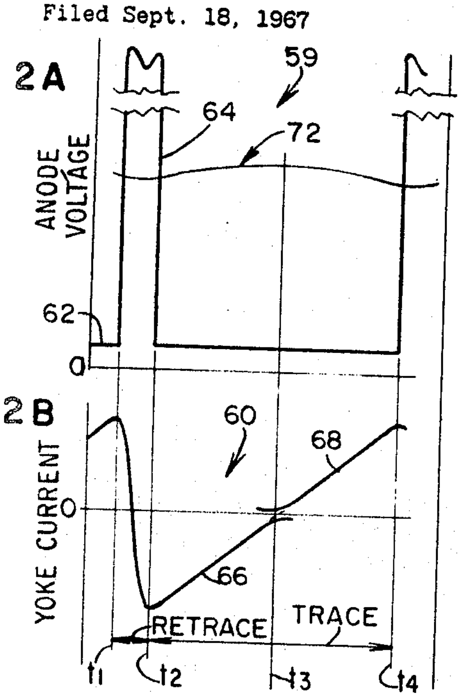
FIG. 2 illustrates waveforms in the horizontal sweep system of FIG. 1.

To explain the operation of the horizontal output system 26, reference is made to FIG. 2 wherein FIG. 2A represents the voltage waveform 59 on the anode 38 of tube 34. FIG. 2B illustrates the sawtooth current 60 which flows through the winding 56 and as shown includes a trace portion to sweep the cathode ray beams across the screen of the cathode ray tube 14 during which time the video information is depicted. The current 60 also includes a retrace portion to rapidly return the cathode ray beams to the left side of the screen to commence a new trace portion. At time $t_1$, a pulse 24 applied to the grid 32 renders the tube 34 nonconductive so that energy stored in the horizontal winding 56 during the previous cycle is transferred into the capacity reflected across the winding 56 including the internal capacity of the winding 56, internal capacity of the autotransformer 40 and controllable capacity to be explained hereinafter. The voltage on the anode 38 rapidly rises from a level 62 equal to its nominal operating potential on the order of 50–100 volts to a very high value and returns to level 62 to form a pulse 64, the duration of which is the inverse of the resonant frequency of the system as determined by the inductance of the winding 56 and thesystem capacity. At the same time, the yoke current is decreasing from its maximum positive value to its maximum negative value to thereby form the retrace portion of the sawtooth current 60.

When the system attempts ot continue to oscillate beyond one-half cycle, damper diode 46 becomes forward biased and therefore limits the voltage swing so that it cannot fall below level 62. Thus, at time $t_2$, the series circuit including the damper diode 46, the boost capacitor 48, a segment of the auto-transformer 40 and the winding 56 conducts a linearly increasing current through the winding 56 to form an initial part 66 of the trace portion of the sawtooth current 60. At time $t_3$ when the current supplied by the damper diode 46 has substantially decayed, the tube 34 is again biased on to conduct a linearly increasing current through the winding 56 to form the terminal part 68 of the sawtooth current 60. At time $t_4$ a pulse from the circuit 22 appears to commence a new cycle.

Between the times $t_2$ and $t_3$, the current flowing through winding 56 also flows through boost capacitor 48 to charge the same with a polarity as indicated. For example, at time $t_3$ the voltage across the capacitor 48 may be in excess of the DC potential from source 53. In such case, the "boosted voltage" for the tube 34 appearing on conductor 70 is in excess of twice the value of such DC potential as indicated by the line 72 of FIG. 2A. It is to be understood that these values and relationships are merely exemplary. At $t_3$ when the tube 34 begins to conduct, the boosted voltage on conductor 70 begins to decrease to supply losses of the system until at time $t_4$, the boosted voltage has reached its minimum value approximately equal to twice the DC potential from supply 53. As is known, the line 72 which represents the changing boost voltage is also the average of the voltage waveform 59.

The slope of the current through an inductor is proportional to the voltage across it divided by its inductance. Since the boost voltage on conductor 70 is substantially constant (usually varying by about ten percent as shown by line 72) and since the voltage on the anode 38 of tube 34 and thus on the tap 58 of autotransformer 40 is also substantially constant during the entire trace portion and equal to level 62, the slope of the initial part 66 and terminal part 68 of the sawtooth current 60 are approximately the same and proportional to the boost voltage.

Figure 3:
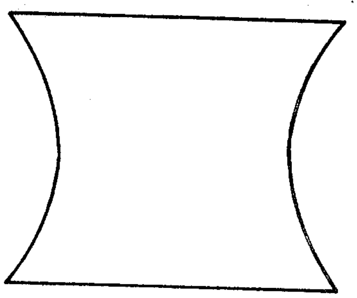
FIG. 3 illustrates a raster having distorted sides.

FIG. 3 illustrates a raster depicted on the screen of a cathode ray tube 14. It will be assumed that the telveision receiver includes sufficient vertical correction to provide the straight top and bottom shown. If there is no side correction, the sides of the raster will bend parabolically inwardly, this characteristic being shown as horizontal pin-cushion distortion. The invention contemplates changing the capacity reflected across the winding 56 at a vertical parabolic rate in order to continually modify the sawtooth current 60 to correct for such distortion. In order to accomplish this, a parabolic signal 74 at the vertical sweep frequency derived from the output tube 78 of the vertical sweep system 18 is coupled to a pincushion correction circuit 80. The circuit includes a coupling capacitor 82 coupled in series with a potentiometer 84 to ground. The movable tap of the potentiometer permits selection of the amplitude of the parabolic signal 74 to be applied to the control grid 86 of a vacuum tube 88. The cathode 90 is coupled through a biasing resistor 92 to ground reference potential, and the anode 94 is coupled to a load resistor 96 to be supplied from the boost voltage on conductor 70. The tube 88 amplifies and inverts the parabolic signal 74 to provide the parabolic signal 98 on the anode 94.

Figure 4:
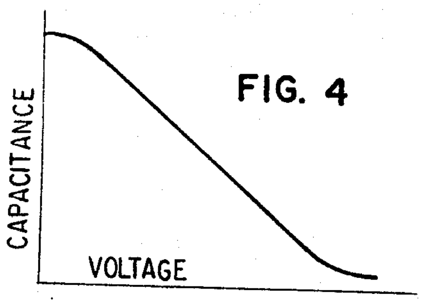
FIG. 4 illustrates the voltage-capacitance characteristic of the voltage variable capacitors of FIG. 1.

The anode 94 is coupled to the junction of a pair of voltage variable capacitors 100 and 102 each having the characteristic shown in FIG. 4, that is, a capacitance which decreases as the voltage across it increases. Alternatively, one of the capacitors could be a standard fixed value type. Voltage variable capacitor is taken to mean either a semiconductor type or any standard capacitor the capacity of which changes within a given range of applied voltage. The latter type, more particularly one having a ceramic dielectric, is preferable because it is relatively inexpensive and is capable of withstanding the substantial voltage across it.

Due to the polarity of the parabolic signal 98, and in order to have the capacitance of capacitors 100 and 102 change in the proper direction, it is necessary to isolate the boost voltage appearing on conductor 70 from the capacitors 100 and 102 by the use of an isolating capacitor 104 coupling capacitor 100 to a tap 106 of autotransformer 40, and an isolating capacitor 108 coupled from capacitor 102 to tap 109. Resistors 110 and 112 effectively ground to the top of capacitor 100 and the bottom of capacitor 102 respectively. Thus, at the top and bottom of the raster respectively corresponding to points 114 and 118 of signal 98, the voltage drop across each of the capacitors 100 and 102 is a maximum and by referring to the graph of FIG. 4, the respective capacitances are a minimum so that the capacity between taps 106 and 109 and thus the capacity reflected across the winding 56 is a minimum. At the middle of the raster corresponding to point 120 on the signal 98, the voltage drop across capacitors 100 and 102 is a minimum and therefore the capacitance between taps 106 and 109 is a maximum as is the capacity reflected across the winding 56. Since the durations of the horizontal pulses in the autotransformer 40 are so short relative to the duration of the vertical signal, they have substantially no affect on the capacitors 100 and 102. Preferably the number of turns between taps 52 and 106 and the number of turns between taps 52 and 109 are the same so that horizontal pulses appearing the autotransformer 40 are cancelled at the junction of capacitors 100 and 102 so as not to interfere with the operation of the tube 88.

Alternatively the voltage variable capacitors 100 and 102 could be placed directly across the winding 56 but in that case they would have to be able to withstand the high voltage on the order of 3 kilovolts or more which would appear across them. In order to use lower voltage rating capacitors they are connected across a smaller number of turns than the number of turns that the winding 56 is coupled across.

Figure 5:
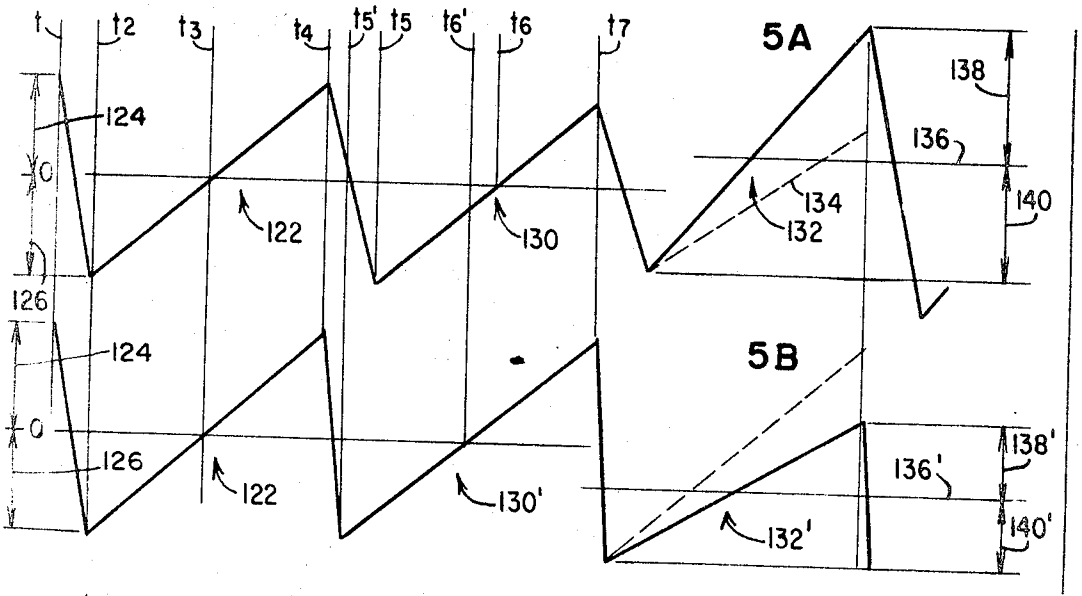
FIG. 5 illustrates the horizontal deflection current for various ones of the scanning lines as modified by the pincushion correction circuit of FIG. 1.

To explain how the change in system capacity affects the horizontal scan width, reference is made to FIG. 5 wherein FIG. 5A represents a series of cycles of the sawtooth current in the winding 56 though not necessarily successive. The first cycle 122 from $t_1$ to $t_4$ corresponds generally to the sawtooth current 60 of FIG. 2B with the amplitude 124 of the peak positive current determining the scan width at the right side of the raster, and with the amplitude 126 of the peak negative current determining the scan width at the left side of the raster. If the capacity reflected across the winding 56 is increased, the resonant frequency of system 26 is decreased to increase the duration of the retrace portion from time duration $t_1$–$t_2$ to time duration $t_4$–$t_5$. As yet, the voltage across the winding 56 and thus the slope of the trace portion have not been affected so that the duration $t_5$–$t_6$ of the initial part of the trace portion of cycle 130 is the same as the duration $t_2$–$t_3$ of the initial part of the trace portion of cycle 122. As previously explained, during the initial part of the trace portion the boost voltage is increasing (FIG. 2A) and since the increase is for the same interval of time in cycles 122 and 130, the boost voltage will reach the same peak value. At $t_7$ a pulse 24 (FIG. 1) commences retrace but because the duration $t_4$–$t_5$ of retrace consumes a greater portion of the cycle 130, the duration $t_5$–$t_7$ of the terminal part of the trace portion is shorter than the duration $t_3$–$t_4$ of the corresponding part of the first cycle 122 so that the boost voltage decreases less and therefore an overall increase in the boost voltage is noted following the second cycle. In the following cycle 132, this causes an increase in the slope of the trace portion (the slopes of the trace portions of cycles 122 and 130 are indicated as a dotted line 134) since, as previously explained, the current in an inductor is proportional to the voltage across it. The zero current level 136 will readjust itself to equalize the positive and negative current $x$ time areas with the result that the amplitudes 138 and 140 of the positive and negative currents, respectively, are greater than the corresponding amplitudes 124 and 126 of the first cycle 122 to thereby increase the scan width both on the left and on the right sides.

Referring to FIG. 5B, if after the first cycle 122 the capacity reflected across winding 56 is reduced, the retrace duration $t_4$–$t_5'$ will be reduced. Since the slopes of the trace portion of the first and second cycles 122 and 130' are the same, the boost voltage at $t_6'$ is the same as that at $t_3$ but because the duration of retrace $t_4$–$t_5'$ consumes a lesser portion of cycle 130', the duration $t_6'$–$t_7$ is increased so that there is an overall decrease in boost voltage. The slope of the next cycle 132' will be decreased, and after readjustment of the zero current axis 136', the amplitudes 138' and 140' of the positive and negative currents, respectively, are less than the corersponding amplitudes of the peak currents in the first cycle 122 to thereby decrease the scan width on the left and right sides of the raster.

In order to facilitate comparison, the change in retrace durations have been shown to be substantial whereas in practice the variations are generally not more than a few percent, and the variations in peak current also do not vary more than a few percent. Also the variations in the shape of the sawtooth current have been shown to occur in discrete steps over three cycles whereas in practice it would take several cycles and would be a continuous change.

To summarize, increasing the effective capacity across the winding 56 increases the duration of retrace which increases the boost voltage on conductor 70 to increase the slope of the trace portion to effect an increase in scan width. A decrease in such effective capacity reduces the duration of retrace to reduce the boost voltage and reduce the slope of the trace portion to reduce the horizontal scan width. As explained previously, the pincushion correction circuit 80 provides a minimum effective capacity across the winding 56 for the horizontal output system 26 at the top and bottom of the raster and a parabolically increasing capacity towards the center of the raster. As explained with reference to FIG. 5, the increased capacity decreases the scan width at the top and bottom of the raster and increases the scan width at the center of the raster to tend to parabolically bend the sides of the raster outwardly and thereby compensate for the inward bending shown in FIG. 3.

Due to the characteristics of present day cathode ray tubes and horizontal deflection yokes, the left hand side of the raster has a tendency to bend to a greater extent than the right side. The circuit 80, in practice, as thus far described provides slightly more correction on the lift which is desirable but in order to equalize the corretion, a potentiometer 142 is coupled from ground through the capacitor 82 to the vertical sweep system 18. The potentiometer provides means to select a portion of the parabolic signal 74 and apply the same through a capacitor 144 and resistors 36 and 30 to the control grid 32 of tube 34 to control the bias thereon. The parabolic signal 74 is poled to provide increasing conduction of the tube at the center of the raster and decreased conduction at the top and the bottom, that being in the proper direction to correct the bending of the raster of FIG. 3. However, as previously explained, the conduction of the tube 34 primarily affects the terminal part of the trace portion of the sawtooth current 60 whereas the damper diode 46 primarily controls the initial part so that varying the setting of potentiometer 142 has its greatest effect on the right hand side of the raster. Thus potentiometer 84 can be set to straighten the left hand side and then potentiometer 142 may be set to straighten the right hand side.

What has been described therefore is an improved circuit utilizing low cost voltage variable capacitors which operate more efficiently than other devices used in presently known pincushion correction circuits.

I claim:

1. In a television receiver having a cathode ray tube, a first sweep system for energizing a first yoke winding with sweep signals to deflect an electron beam of the cathode ray tube in a given direction, a second sweep system including an electron control device for energizing a second yoke winding with further sweep signals to deflect the beam in a direction orthogonal to the given direction, thereby forming a raster with a pair of opposing borders parallel to the given direction and with a tendency to be bent, a pincushion correction circuit for straightening the borders and including in combination; circuit means coupled to the first sweep system to provide a correction signal at the frequency of the sweep signals therefrom, voltage variable capacitor means coupled to said circuit means and responsive to said correction signal to have its capacitance change at a rate established by the above mentioned frequency, means coupling said capacitor means in circuit with the second yoke winding and the second sweep system to modify the further sweep signals and straighten the pair of opposing borders of the raster, and a bias control circuit coupled to said circuit means and to the electron control device, said bias control circuit being responsive to said correction signal to control the bias on said electron control device at a rate established by the frequency of the sweep signals from the first sweep circuit.

2. In a television receiver having a cathode ray tube, horizontal and vertical deflection yoke windings for deflecting an electron beam thereof to form a raster with a pair of opposing sides having a tendency to be parabolically bent, a vertical sweep system for applying sweep signals at a vertical frequency to the vertical yoke winding, a horizontal sweep system including in combination: an electron control device for energizing the yoke winding with a sawtooth current having trace and retrace portions, voltage variable capacitor means coupled to the horizontal yoke winding to control the duration of the retrace portion, first circuit means for boosting the value of an available direct current potential by an amount related to the duration of the retrace portion, said circuit means being coupled to the horizontal yoke for varying the slope of the trace portion of the sawtooth current and thus the width of the raster by an amount related to the value of the boosted direct current potential, second circuit means coupled to the vertical sweep system to provide a parabolic signal at the vertical frequency, said voltage variable capacitor means being coupled to said second circuit means to parabolically vary the capacitance thereof at a rate established by the vertical frequency, thereby parabolically varying the width of the raster.

3. The television receiver set forth in claim 2 wherein said second circuit means includes a damper diode and boost capacitor means coupled in series with the horizontal yoke, the direct current potential being coupled to the junction of said capacitor means and said diode, with said booster capacitor means being charged during an initial part of the trace portion and discharged during a terminal part of the trace portion by an amount dependent on the duration of the retrace portion to thereby affect the value of the boosted voltage.

4. The television receiver set forth in claim 2 wherein the horizontal sweep system includes an autotransformer having first, second, third and fourth taps, said first tap being coupled to said electron control device, said second circuit means including a damper diode and a boost capacitor coupled in series between said second and fourth taps to provide said boosted voltage on said fourth tap, a direct current potential being coupled to the junction of said capacitor and said diode, the horizontal yoke winding being coupled across said third and fourth taps, said capacitor being charged during an initial part of the trace portion and discharged during a terminal part of the trace portion by an amount dependent on the duration of the retrace portion to thereby affect the value of boosted voltage.

5. The television receiver set orth in claim 4 wherein said second circuit means includes an amplifier device for increasing the amplitude of the parabolic signal and means for selecting the amplitude of such signal, said voltage variable capacitor means including a pair of voltage variable capacitors coupled in series across a segment of the autotransformer, with the junction of said capacitors being coupled to said amplifier device.

6. The television receiver set forth in claim 4 wherein said voltage variable capacitor means includes a pair of voltage variable capacitors coupled in series with the junction thereof coupled to said second circuit means and referenced to the boosted voltage, a pair of resistors coupled in series and across said pair of capacitors, with the junction thereof coupled to a ground reference potential to reference the respective ends of said capacitors to said reference potential, a pair of further capacitors individually coupling the ends of said voltage variable capacitors to points on either side of said fourth tap of said autotransformer to isolate the boosted voltage from the ends of said voltage variable capacitors.

7. The television receiver set forth in claim 2 further including a bias control circuit coupled to said second circuit means and to the electron control device to parabolically control the bias thereon at a rate established by the vertical frequency, the bias control circuit including means to select the amplitude of the parabolic signal applied to said device.

References Cited

UNITED STATES PATENTS

| | | | |
|---|---|---|---|
| 2,899,601 | 8/1959 | Simmons | 315—27 |
| 2,906,919 | 9/1959 | Thor et al. | 315—276 |
| 3,309,560 | 3/1967 | Popopi | 315—276 |

RODNEY D. BENNETT, Jr. *Primary Examiner.*

JOSEPH G. BAXTER, *Assistant Examiner.*

U.S. Cl. X.R.

315—27